United States Patent
Ahn et al.

(10) Patent No.: US 6,665,247 B2
(45) Date of Patent: Dec. 16, 2003

(54) LAND/GROOVE DISCRIMINATING METHOD AND OPTICAL RECORDING/REPRODUCING APPARATUS EMPLOYING THE METHOD

(75) Inventors: Young-man Ahn, Gyeonggi-do (KR); Chong-sam Chung, Gyeonggi-do (KR); Tae-Kyung Kim, Seoul (KR); Hea-jung Suh, Kyungki-do (KR); Jong-bae Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 18 days.

(21) Appl. No.: 10/024,340

(22) Filed: Dec. 21, 2001

(65) Prior Publication Data
US 2002/0163868 A1 Nov. 7, 2002

(30) Foreign Application Priority Data
May 2, 2001 (KR) .......................... 2001-23749

(51) Int. Cl.⁷ ................................. G11B 7/00
(52) U.S. Cl. ................. 369/53.22; 369/112.02
(58) Field of Search ............... 369/53.22, 112.01, 369/112.02, 112.1, 112.15, 44.42, 44.25, 44.26

(56) References Cited

U.S. PATENT DOCUMENTS 6,091,693 A * 7/2000 Morimoto .................... 369/112

* cited by examiner

Primary Examiner—Nabil Hindi
(74) Attorney, Agent, or Firm—Staas & Halsey LLP

(57) ABSTRACT

A land/groove discriminating method and an optical recording and/or reproducing apparatus employing the method are provided. The land/groove discriminating method emits a light beam onto an optical disc having lands and grooves through an optical element capable of causing and varying an effect of thickness variation of the optical disc, detects a light beam reflected/diffracted from the optical disc by dividing the reflected/diffracted light beam into inner and outer light beam portions, and discriminates between a land and a groove of the optical disc by detecting variation in a difference signal between detection signals from the inner and outer light beam portions while varying the degree of the effect of thickness variation of the optical disc by driving the optical element.

26 Claims, 8 Drawing Sheets

```
| I | E | H | L |
|   | A | D |   |
|   | B | C |   |
| J | F | G | K |
```
— 48

LAND/GROOVE DISCRIMINATING METHOD AND OPTICAL RECORDING/ REPRODUCING APPARATUS EMPLOYING THE METHOD

CROSS-REFERENCE TO RELATED APPLICATIONS

This application claims the benefit of Korean Patent Application No. 2001-23749 filed on May 2, 2001, in the Korean Industrial Property Office, the disclosure of which is incorporated herein by reference.

BACKGROUND OF THE INVENTION

1. Field of the Invention

The present invention relates to a method of discriminating whether a light spot is formed on a land or a groove of a land-groove type optical disc, and to an optical recording and/or reproducing apparatus employing the same.

2. Description of the Related Art

For reliable tracking and focusing with respect to a land-groove type optical disc, there is a need to discriminate whether a current light beam spot is positioned on a land or in a groove. This is because compensation of an offset for a tracking error signal caused by objective lens shifting in tracking by a push-pull method and compensation of a focus offset should each be applied differently to lands and grooves.

Referring to FIG. 1, a conventional optical pickup to discriminate lands and grooves includes a light source 1, a collimating lens 3 collimating a diverging light beam emitted from the light source 1, a hologram element 5 splitting a light beam by diffraction, a polarizing beam splitter 7 transmitting or reflecting an incident light beam according to the polarization of the incident light beam, a quarter-wave plate 9 changing the polarization of an incident light beam, an objective lens 11 focusing an incident light beam to form a light spot on an optical disc 10, and a photodetector 15 receiving a light beam reflected/diffracted by the optical disc 10.

The hologram element 5 diffracts an incident light beam into a main light beam and first and second sub-light beams. As shown in FIG. 2, the hologram element 5 has first through fourth sections 5a, 5b, 5c, and 5d and is designed such that a light beam passing through the first and third sections 5a and 5c has a phase difference of 90° with respect to a light beam passing through the second and fourth sections 5b and 5d. Thus, the phase of a portion of the first sub-light beam, i.e., a +1$^{st}$ order light beam, having passed through the first and third sections 5a and 5c leads that of a portion of the first sub-light beam having passed through the second and fourth sections 5b and 5d by 90°. In contrast, the phase of a portion of the second sub-light beam, i.e., a −1$^{st}$ order light beam, having passed through the first and third sections 5a and 5c lags that of a portion of the second sub-light beam having passed through the second and fourth sections 5b and 5d by 90°.

Referring to FIG. 3, the objective lens 11 forms a main light spot 1a and first and second sub-light spots 1b and 1c on the optical disc 10 by focusing the main light beam and the first and second sub-light beams split by the hologram element 5.

Referring to FIG. 4, the photodetector 15 includes a main photodetector 15a and first and second sub-photodetectors 15b and 15c receiving the main light beam and the first and second sub-light beams reflected by the optical disc 10, respectively. The main photodetector 15a includes four divided plates A, B, C, and D, the first sub-photodetector 15b includes four divided pates E, F, G, and H, and the second sub-photodetector 15c includes four divided plates I, J, K, and L.

Supposing that signals output from the four divided plates A, B, C, and D of the main photodetector 15a are designated by a, b, c, and d, respectively, signals output from the four divided plates E, F, G, and H of the first sub-photodetector 15b are designated by e, f, g, and h, respectively, signals output from the four divided plates I, J, K, and L of the second sub-photodetector 15c are designated by i, j, k, and l, respectively, and a reproduction signal RFS, a land/groove (L/G) signal, and a tracking error signal TES are expressed as formulae (1):

$$RFS = a+b+c+d$$

$$L/G\ signal = (e+g+j+) - (f+h+l+k)$$

$$TES = (a+b) - (c+d) \quad (1)$$

The tracking error signal TES and the land/groove (L/G) signal detected as described above have the same period but a phase difference of 90°, as shown in FIG. 5. When the tracking error signal TES has a value of zero, the land/groove (L/G) signal has a maximum or minimum value, respectively. Thus, whether a light spot is focused on a land or groove of the optical disc can be determined. However, the conventional optical pickup described above uses three light beams split from a light beam emitted from the light source 1 so that there is a problem with light utilization efficiency.

SUMMARY OF THE INVENTION

Accordingly, it is an object of the present invention to provide a method of discriminating whether a light spot is focused on a land or a groove of an optical disc using an optical element that can generate an effect of thickness variation of the optical disc, which can achieve high light utilization efficiency by using a single light beam, and an optical recording and/or reproducing apparatus employing the same.

Additional objects and advantages of the invention will be set forth in part in the description which follows and, in part, will be obvious from the description, or may be learned by practice of the invention.

The foregoing and other objects of the present invention are achieved by providing a land/groove discriminating method comprising: emitting a light beam onto an optical disc having lands and grooves through an optical element causing and varying an effect of thickness variation of the optical disc; detecting a light beam reflected/diffracted from the optical disc by dividing the reflected/diffracted light beam into inner and outer light beam portions; and discriminating between a land and a groove of the optical disc by detecting variation in a difference signal between detection signals from the inner and outer light beam portions while varying the degree of the effect of thickness variation of the optical disc by driving the optical element.

The above and other objects of the present invention may also be achieved by providing an optical recording and/or reproducing apparatus comprising: an optical pickup comprising an optical element on a traveling path of a light beam emitted from a light source to be focused on an optical disc by an objective lens, the optical element causing and varying an effect of thickness variation of the optical disc, and a photodetector device which detects a light beam reflected/diffracted by the optical disc by dividing the reflected/diffracted light beam into inner and outer light beam portions; and a signal processing unit which detects a difference signal by subtracting a detection signal from at least one outer light beam portion from a detection signal from the inner light beam portion and discriminates between a land and a groove of a land/groove type optical disc by detecting variation in the difference signal while varying the degree of the effect of thickness variation of the optical disc by driving the optical element.

The above and other objects may also be achieved by providing that the optical element compensates for spherical aberration caused by thickness variation of the optical disc. Additionally, it may be provided that discrimination between a land and a groove of the optical disc is determined by an increase or decrease in the DC level of the difference signal.

Further, it may be provided in an embodiment of the present invention that the photodetector device detects the light beam by dividing it into inner and outer light beam portions in a direction corresponding to a radial direction of the optical disc. Further, it may be provided that the photodetector device is formed of many different types of photodetectors that will provide the desired results of the present invention, such as, for example, an 8-sectional photodetector.

Alternatively, in an embodiment of the present invention, the photodetector device may be constructed to detect the light beam by dividing it into a circular or rectangular inner light beam portion and an outer light beam portion surrounding the circular or rectangular inner light beam portion. As another example, the photodetector device maybe a 12-sectional photodetector including four inner divided plates receiving an inner light beam portion and eight outer divided plates surrounding the inner divided plates receiving an outer light beam portion.

BRIEF DESCRIPTION OF THE DRAWINGS

These and other objects and advantages of the present invention will become apparent and more readily appreciated from the following description of the embodiments, taken in conjunction with the accompany drawings of which:

FIGS. 7 through 9 show alternative embodiments of a photodetector device of FIG. 6;

DETAILED DESCRIPTION OF THE PREFERRED EMBODIMENTS

Figure 1:
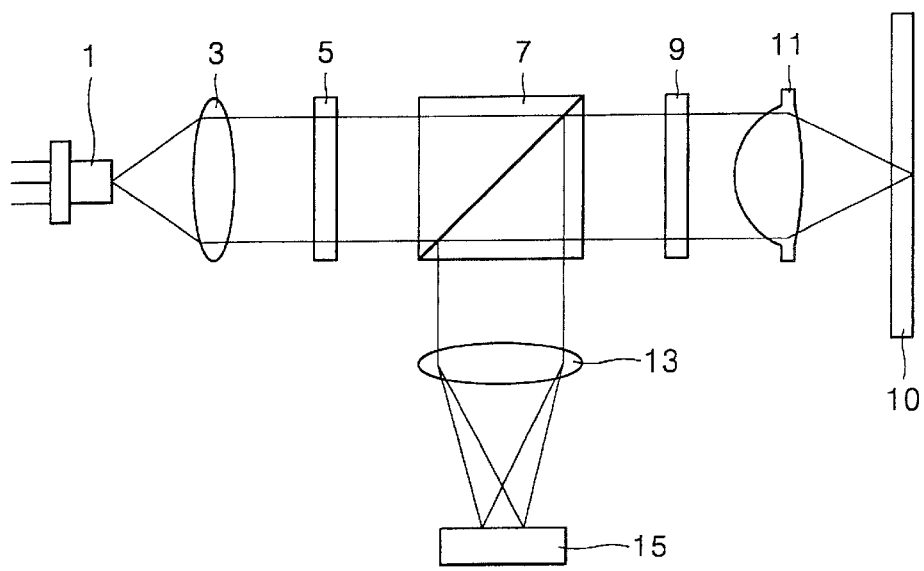
FIG. 1 is a diagram of a conventional optical pickup discriminating between a land and a groove of an optical disc.
Figure 2:
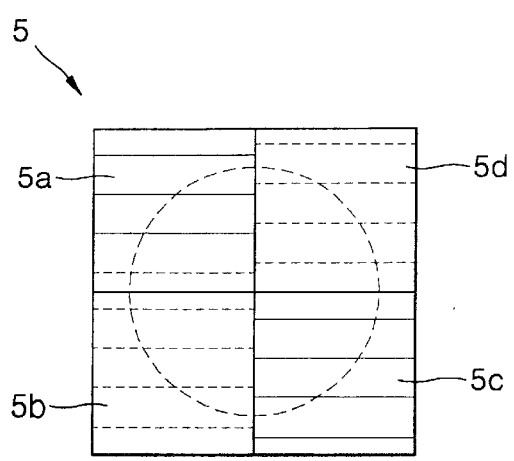
FIG. 2 is a plan view of a hologram element of FIG. 1.
Figure 3:
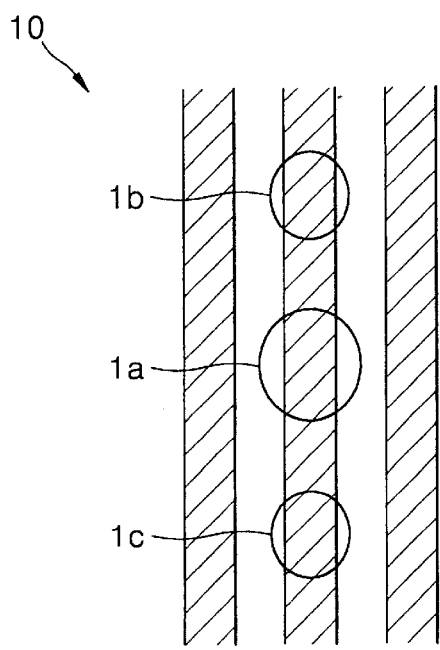
FIG. 3 shows light spots formed on an optical disc by the optical pickup of FIG. 1.
Figure 4:
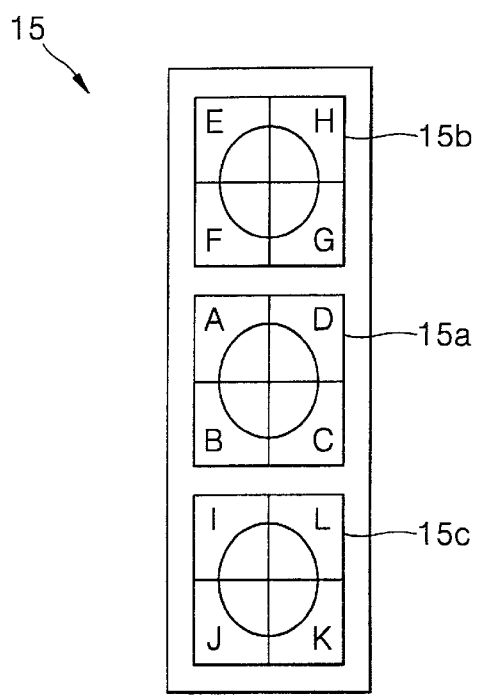
FIG. 4 is a plan view of a photodetector of FIG. 1.
Figure 5:
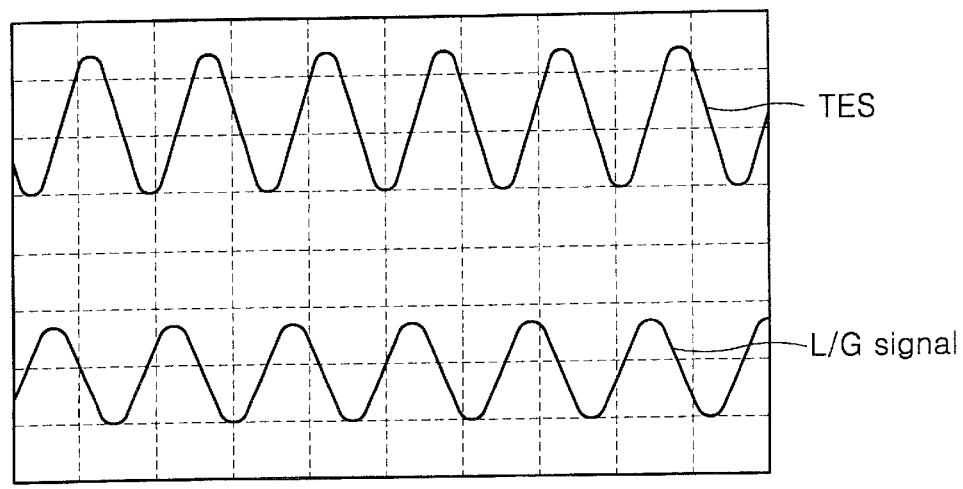
FIG. 5 is a graph of a tracking error signal TES and a land/groove (L/G) signal detected in an optical recording and/or reproducing apparatus employing the optical pickup of FIG. 1.

Reference will now be made in detail to the embodiments of the present invention, examples of which are illustrated in the accompanying drawings, wherein like reference numerals refer to the like elements throughout. The embodiments are described below in order to explain the present invention by referring to the figures.

The present invention discriminates between a land and a groove of a land-groove type optical disc by emitting a single light beam onto the optical disc through an optical element causing an effect of thickness variation of the optical disc, detecting a light beam reflected from the optical disc by dividing the reflected beam into inner and outer light beam portions, and detecting variation in a difference signal between detection signals from the inner and outer light beam portions according to the effect of thickness increase or decrease of the optical disc.

Figure 6:
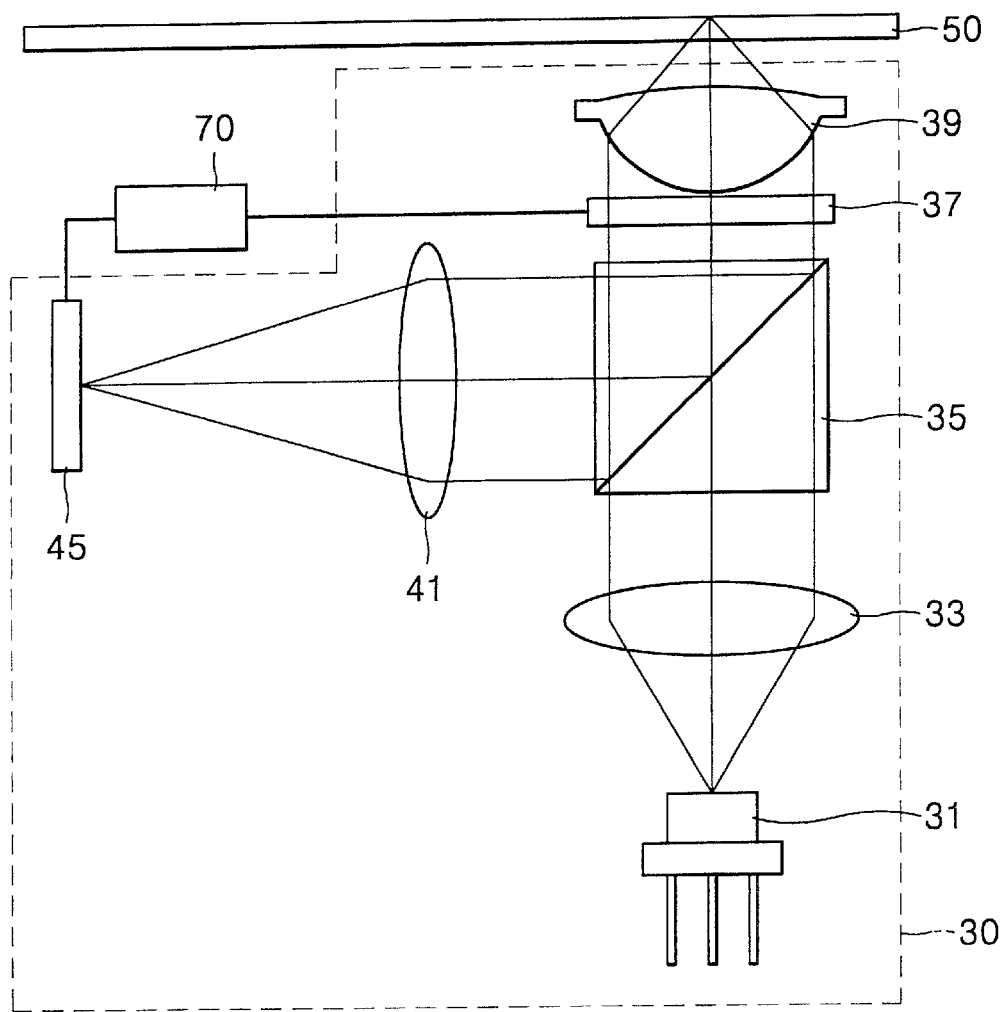
FIG. 6 is a diagram of an embodiment of an optical recording and/or reproducing apparatus according to the present invention.
Figure 10:
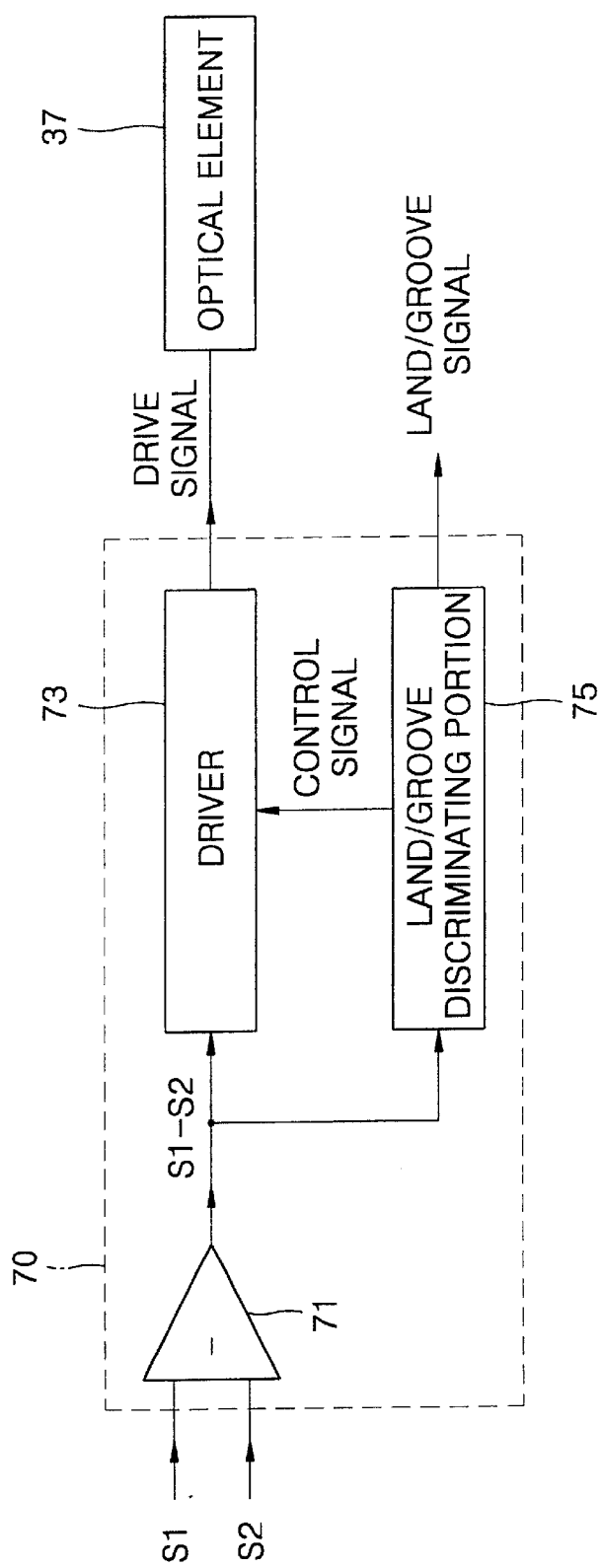
FIG. 10 is a block diagram of an example of the structure of a signal processing unit of FIG. 6.

Referring to FIG. 6, an embodiment of an optical recording and/or reproducing apparatus according to the present invention includes an optical pickup 30 and a signal processing unit 70 which processes a land/groove discrimination signal to discriminate whether a light beam is focused on a land or a groove of an optical disc 50.

The optical pickup 30 includes a light source 31, an objective lens 39 which focuses a light beam emitted from the light source 31 to form a light spot on the optical disc 50, an optical path changing device 35 on an optical path between the light source 31 and the objective lens 39, which alters the traveling path of an incident light beam, an optical element 37 on the optical path between the light source 31 and the objective lens 39, which generates the effect of thickness variation of the optical disc 50, and a photodetector device 45 which detects a light beam reflected/diffracted from the optical disc 50 by dividing the light beam reflected from the optical disc 50 into an inner light portion and an outer light portion.

The light source 31 may be a semiconductor laser such as an edge emitting laser or a vertical cavity surface emitting laser (VCSEL). As the optical path changing device 35, a beam splitter transmitting and reflecting an incident light beam at a predetermined ratio can be used. Alternatively, the optical path changing device 35 may be a combination of a polarizing beam splitter (not shown) which selectively transmits or reflects an incident light beam according to the polarization of the incident light beam, and a quarter-wave plate (not shown) on an optical path between the polarizing beam splitter and the objective lens 39, which changes the phase of an incident light beam.

When the optical recording and/or reproducing apparatus according to the present invention is used to record and reproduce with a next generation digital versatile disc (DVD), a so-called high-definition (HD)-DVD family recording medium, an embodiment of the present invention provides that the light source 31 is a blue semiconductor laser which emits a beam having a wavelength of 400–420 nm, and preferably about 405 nm, and that the objective lens 39 has a numerical aperture (NA) of 0.7 or greater, for example, an NA of about 0.85.

The optical pickup 30 may further comprise a collimating lens 33 on an optical path between the light source 31 and the optical path changing device 35 to collimate a diverging light beam emitted from the light source 31, and a sensing lens 41 on an optical path between the optical path changing device 35 and the photodetector device 45 to condense an incident light beam on the photodetector device 45.

In an embodiment of the present invention, the optical element 37 is able to variably compensate for spherical aberration caused by thickness variation of the optical disc 50. A spherical aberration is compensated for by changing the phase of a light beam using an optical element to compensate for spherical aberration and then project the light beam, having an opposite wavefront with respect to a spherical aberration caused by thickness variation of an optical disc, onto the optical disc. By using inversely the principle of compensating for spherical aberration caused by thickness variation of the optical disc 50 by intentionally causing inverse spherical aberration, an effect of thickness variation of the optical disc 50 can be induced by causing spherical aberration in a light beam incident on the optical disc 50.

The optical element 37 described above may be a liquid crystal plate manufactured by injecting liquid crystals between two transparent substrates each having an electrode pattern. Due to the anisotropic property of liquid crystal with respect to refractive index, the phase of the light beam passing through the liquid crystal plate changes. By driving the liquid crystal plate to generate the effect of thickness variation of the optical disc 50 and to vary the degree of the effect of thickness variation of the optical disc 50, or by changing the shape of the wavefront of a light beam incident on the optical disc 50 by dividing the liquid crystal plate such that the light beam has the inverse of the wavefront shape with respect spherical aberration caused by thickness variation of the optical disc 50, discrimination between a land and a groove of the optical disc 50 can be performed, or spherical aberration caused by thickness variation of the optical disc 50 can be compensated for.

A driving circuit used with the optical element 37 may be included in or separated from the signal processing unit 70.

The optical recording and/or reproducing apparatus according to the present invention, having the optical element 37 described above, can discriminate between a land and a groove of the optical disc 50 or can compensate for spherical aberration caused by thickness variation of the optical disc 50. Here, the thickness of the recording medium means the distance from a light receiving surface to an information recording surface of the optical disc 50. The thickness variation of the optical disc 50, which causes spherical aberration that needs to be corrected, includes thickness deviation according to position on the optical disc 50 and a thickness difference between the optical disc 50 and another optical disc.

The photodetector device 45 may be constructed to detect the light beam from the optical disc 50 by dividing the same into an inner light beam portion and an outer light beam portion in a direction corresponding to the radial direction of the optical disc 50. Here, it is preferable that a division ratio of the inner to outer light beam portions is in the range of 10:90–90:10.

An embodiment of the present invention provides that a photodetector 46, as shown in FIG. 7, can be used as the photodetector device 45 in consideration of detection of a focus error signal. The photodetector 46 is capable of detecting a light beam by dividing it into inner and outer light beam portions in a direction corresponding to the radial direction of the optical disc 50 with an 8-sectional configuration.

First through fourth inner divided plates A1, B1, C1, and D1 of the 8-sectional photodetector 46 receive inner light beam portions. First through fourth outer divided plates A2, B2, C2, and D2, which are arranged outside the first through fourth inner divided plates A1, B1, C1, and D1, respectively, in a direction corresponding to the radial direction of the optical disc 50, receive outer light beam portions.

Alternatively, in an embodiment of the present invention, the photodetector device 45 may be constructed to detect the light beam by dividing it into circular or rectangular inner light beam portions and outer light beam portions that completely surround the inner light beam portions. For example, an 8-sectional photodetector 47 or a 12-sectional photodetector 48, as shown in FIGS. 8 and 9, respectively, capable of detecting the light beam by dividing it into rectangular inner light beam portions and outer light beam portions bounding the inner light beam portions, can be used as the photodetector device 45.

Inner divided plates A1', B1', C1', and D1' of the 8-sectional photodetector 47 receive inner light beam portions. Outer divided plate A2', B2', C2', and D2', which are arranged around the inner divided plates A1', B1', C1', and D1', respectively, receive outer light beam portions. Inner divided plates A, B, C, and D of the 12-sectional photodetector 48 receive inner light beam portions, and outer divided plates E, F, G, H, I, J, K, and L surrounding the inner divided plates A, B, C, and D receive outer light beam portions.

Alternatively, in an embodiment of the present invention, the photodetector device 45 may be a combination of a hologram optical element (HOE, not shown) having a plurality of diffraction areas through which an incident light beam can be divided into inner and outer light beam portions corresponding to the divided plates of the 8-sectional photodetector 46 of FIG. 7 or 47 of FIG. 8, or the 12-sectional photodetector 48 of FIG. 9, and a plurality of photodetectors (not shown) detecting the inner and outer light beam portions divided and diffracted by the HOE.

The present applicant has suggested an optical pickup having an optical configuration to correct spherical aberration caused by thickness variation of an optical disc with the above-described optical element compensating for the spherical aberration. This optical pickup is described in a U.S. patent application corresponding to Korean Patent Application No. 00-84211 filed on Dec. 28, 2000, entitled "Optical Pickup Capable of Detecting Thickness Variation of Recording Medium and/or Capable of Compensating for Spherical Aberration Caused by Thickness Variation of Recording Medium." The optical pickup 30 employed by the optical recording and/or reproducing apparatus according to the present invention includes the optical features of the optical pickup disclosed in the U.S. patent application described above, and thus diverse embodiments for the photodetector device 45 will not be described in greater detail here.

The signal processing unit 70 detects a difference signal by subtracting a detection signal from at least one outer light beam portion from a detection signal from an inner light beam portion and feeds back the difference signal to drive the optical element 37. This results in varying the degree of the effect of thickness variation of the optical disc 50 and discriminating between a land and a groove of the optical disc 50 by detecting variations in the difference signal, in particular, a DC level variation of the difference signal.

Denoting detection signals from the inner and outer light beam portions as S1 and S2, respectively, as shown in FIG.

10, the signal processing unit 70 may include a subtractor 71 subtracting the detection signal S2 of at least one outer light beam portion from the detection signal S1 of the inner light beam portion, a driver 73 driving the optical element 37 based upon a difference signal (S1−S2) output from the subtraction unit 71, and a land/groove discriminating portion 75 varying the degree of the effect of thickness variation of the optical disc 50 by controlling the driver 73 and outputting a land/groove (L/G) signal discriminating between a land and a groove of the optical disc 50 from variation in the DC level of the difference signal (S1−S2).

To enhance the difference signal in a land and a groove according to the degree of the effect of thickness variation of the optical disc 50, the signal processing unit 70 may be constructed such that at least one of the detection signals from the inner and outer light beam portions is amplified before the subtraction.

The difference signal, and particularly variation in the DC level of the difference signal can be used as a land/groove discrimination signal and a spherical aberration detection signal to compensate for spherical aberration caused by thickness variation of the optical disc 50.

As can be understood from the above, an embodiment of the optical recording and/or reproducing apparatus according to the present invention can discriminate between a land and a groove of the optical disc 50, and can compensate for spherical aberration caused by thickness variation of the optical disc, without need for an additional optical element by using the optical system of optical pickup 30 employing the optical element 37 for compensation of spherical aberration. The spherical aberration detection signal varies in opposite directions for a land and a groove of an optical disc. According to the present invention, the direction in which spherical aberration caused by thickness variation of the optical disc 50 should be compensated for can be determined by the land/groove discrimination signal detected in the optical recording and/or reproducing apparatus according to the present invention. Therefore, spherical aberration can accurately be corrected according to whether a light beam is focused on a land or a groove of the optical disc.

The principle of discriminating between a land and a groove of an optical disc in the optical recording and/or reproducing apparatus according to the preferred embodiment of the present invention now will be described.

Figure 11A:
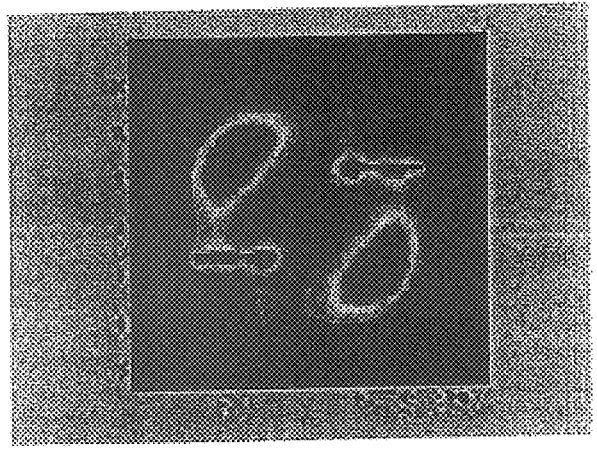
FIGS. 11A and 11B show the intensity distributions of light beams reflected from an optical disc after having been focused on a land and a groove of the optical disc.
Figure 11B:
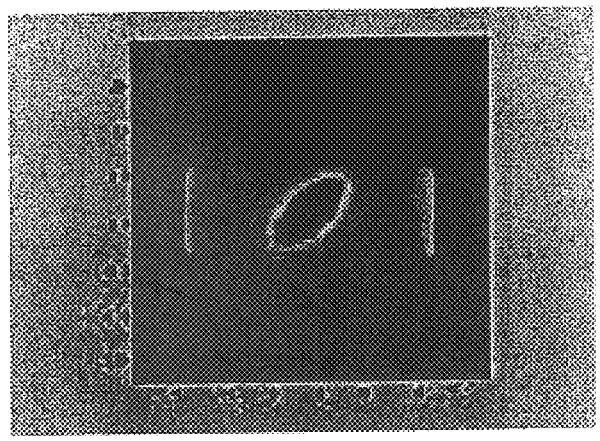

FIGS. 11A and 11B show the intensity distributions of light beams reflected from a land and a groove of an optical disc, respectively. These intensity distributions are shown at the exit pupil of an objective lens when data is reproduced from a land-groove type optical disc having a groove width of 0.30 μm using a light source having a 400-nm wavelength and an objective lens having an NA of 0.85. Further, these results are with respect to an effect of thickness increase of the optical disc by about 10 μm. As can be seen from FIGS. 11A and 11B, the intensity distributions of the light beams reflected from a land and a groove of the optical disc with respect to the effect of thickness increase of the optical disc 50 vary with opposite profiles. In particular, for a land area of the optical disc 50, the outer light beam portions of the reflected light beam have greater intensity than the inner light beam portions. In contrast, for a groove area of the optical disc 50, the intensity of the reflected light beam is greater in the inner light beam portions than in the outer light beam portions. The difference in the intensity distributions of FIGS. 11A and 11B illustrates that a DC level of a difference signal (hereinafter, referred to as land/groove discrimination signal) between the deflection signals from the inner and outer light beam portions decreases for a land area and increases for a groove area of the optical disc.

Figure 12:
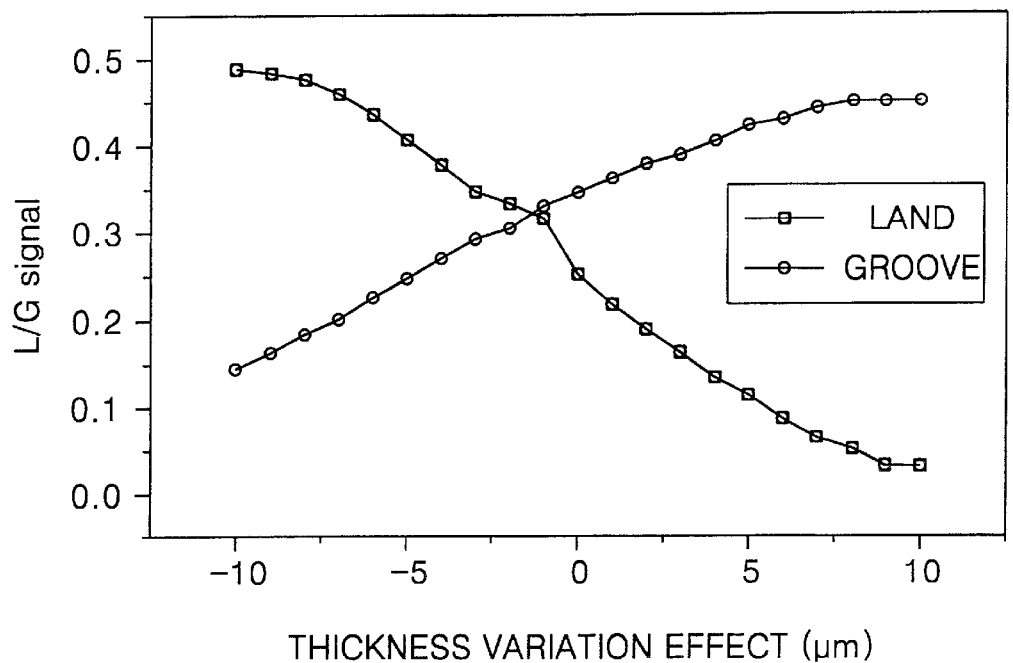
FIG. 12 is a graph of variations of land/groove discrimination signals for a land and a groove of the optical disc detected by the optical recording and/or reproducing apparatus according to the present invention with respect to the effect of thickness variation of the optical disc.

FIG. 12 is a graph of land/groove signals for a land and a groove of an optical disc detected using the 8-sectional photodetector of FIG. 7 as the photodetector device 45 according to variation of an effect of thickness of the optical disc from −10 to +10 μm. The results of FIG. 12 were obtained using a light source having a 405-nm wavelength and an objective lens having an NA of 0.85 and a focal length of 1.76 mm for a 0.1-mm thick RAM type optical disc with lands and grooves. The optical disc comprises a track pitch of 0.32 μm, a groove depth of −λ/6, and a minimum mark (3T) length of 0.194 μm.

Referring to FIG. 12, when the effect of thickness increase of the optical disc 50 from −10 to +10 μm is caused by driving the optical element 37, it is apparent that the land/groove discrimination signal linearly decreases at a land and linearly increases at a groove of the optical disc 50.

Thus, the optical recording and/or reproducing apparatus according to the present invention described above can discriminate between a land and a groove of an optical disc by detecting an increase or decrease in the DC level of the difference signal while varying the effect of thickness variation of the optical disc 50 by driving the optical element 37. Accordingly, before feeding back a spherical aberration detection signal, which is used to compensate for spherical aberration caused by thickness variation of the optical disc 50, to the optical element 37, it can be determined whether a current light beam is focused on a land or a groove of the optical disc 50, thereby enabling spherical aberration compensation in an accurate direction.

In addition, since the optical recording and/or reproducing apparatus according to the present invention described above can discriminate whether the position of a current light spot is on a land or a groove of an optical disc, it is possible to optimize a focus and/or tracking servo.

Although the optical element 37 is described and illustrated as also providing a function of compensating for spherical aberration in the embodiment described above, the optical element 37 may just have the function of generating the effect of thickness variation of the optical disc 50, not the spherical aberration compensation function.

As described above, in the optical recording and/or reproducing apparatus according to the present invention, a land-groove type optical disc is irradiated with a single light beam emitted from a light source through an optical element capable of generating an effect of thickness variation of the optical disc. A light beam reflected from the optical disc is divided into and received as inner and outer light beam portions, and variation in a difference signal between detection signals from the inner and outer light beam portions is detected while increasing or decreasing the degree of the effect of thickness variation of the optical disc. Whether the position of a current light spot is on a land or a groove of the optical disc is discriminated from the variation in the difference signal. This structure of the optical recording and/or reproducing apparatus according to the present invention has higher light utilization efficiency.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A land/groove discriminating method comprising:
   emitting a light beam onto an optical disc having lands and grooves through an optical element causing and varying an effect of thickness variation of the optical disc;
   detecting the light beam reflected/diffracted from the optical disc by dividing the reflected/diffracted light beam into inner and outer light beam portions; and
   discriminating between a land and a groove of the optical disc by detecting variation in a difference signal between detection signals from the inner and outer light beam portions while varying the degree of the effect of thickness variation of the optical disc by driving the optical element.

2. The land/groove discriminating method of claim 1, wherein the optical element is used to compensate for spherical aberration caused by a thickness variation of the optical disc.

3. The land/groove discriminating method of claim 1, wherein the discrimination between the land and the groove of the optical disc is determined from an increase or decrease in a DC level of the difference signal.

4. The land/groove discriminating method of claim 2, wherein the discrimination between the land and the groove of the optical disc is determined from an increase or decrease in the DC level of the difference signal.

5. An optical recording and/or reproducing apparatus comprising:
   an optical pickup comprising an optical element on a traveling path of a light beam emitted from a light source to be focused on a land/groove type optical disc by an objective lens, the optical element causing and varying an effect of thickness variation of the optical disc, and a photodetector device to detect the light beam reflected/diffracted by the optical disc by dividing the reflected/diffracted light beam into inner and outer light beam portions; and
   a signal processing unit to detect a difference signal by subtracting a detection signal from at least one outer light beam portion from a detection signal from the inner light beam portion and to discriminate between a land and a groove of the optical disc by detecting variation in the difference signal while varying the degree of the effect of thickness variation of the optical disc by driving the optical element.

6. The optical recording and/or reproducing apparatus of claim 5, wherein the optical element is used to compensate for spherical aberration caused by thickness variation of the optical disc.

7. The optical recording and/or reproducing apparatus of claim 5, wherein the signal processing unit discriminates between a land and a groove of the optical disc based upon an increase or decrease in a DC level of the difference signal.

8. The optical recording and/or reproducing apparatus of claim 5, wherein a division ratio of the inner and outer light beam portions is in the range of 10:90–90:10.

9. The optical recording and/or reproducing apparatus of claim 5, wherein the photodetector device detects the light beam by dividing it into inner and outer light beam portions in a direction corresponding to a radial direction of the optical disc.

10. The optical recording and/or reproducing apparatus of claim 7, wherein the photodetector device detects the light beam by dividing it into inner and outer light beam portions in a direction corresponding to a radial direction of the optical disc.

11. The optical recording and/or reproducing apparatus of claim 9, wherein the photodetector device is an 8-sectional photodetector.

12. The optical recording and/or reproducing apparatus of claim 10, wherein the photodetector device is an 8-sectional photodetector.

13. The optical recording and/or reproducing apparatus of claim 5, wherein the photodetector device detects the light beam by dividing the light beam into the inner light beam portion which is circular or rectangular and the outer light beam portion surrounding the circular or rectangular inner light beam portion.

14. The optical recording and/or reproducing apparatus of claim 7, wherein the photodetector device detects the light beam by dividing the light beam into the inner light beam portion which is circular and rectangular and the outer light beam portion surrounding the circular or rectangular inner light beam portion.

15. The optical recording and/or reproducing apparatus of claim 13, wherein the photodetector device is a 12-sectional photodetector including four inner divided plates to receive the inner light beam portion and eight outer divided plates surrounding the inner divided plates to receive the outer light beam portion.

16. The optical recording and/or reproducing apparatus of claim 14, wherein the photodetector device is a 12-sectional photodetector including four inner divided plates to receive an inner light beam portion and eight outer divided plates surrounding the inner divided plates to receive an outer light beam portion.

17. The optical recording and/or reproducing apparatus of claim 5, wherein the optical element is a liquid crystal plate.

18. The optical recording and/or reproducing apparatus of claim 11, wherein the photodetector device comprises:
   a hologram optical element having a plurality of diffraction areas through which an incident light beam is divided into the inner and outer light beam portions corresponding to said 8 sections; and
   a plurality of photodetectors detecting the inner and outer light beam portions divided and diffracted by said hologram optical element.

19. The optical recording and/or reproducing apparatus of claim 15, wherein the photodetector device comprises:
   a hologram optical element having a plurality of diffraction areas through which an incident light beam is divided into the inner and outer light beam portions corresponding to said 12 sections; and
   a plurality of photodetectors detecting the inner and outer light beam portions divided and diffracted by said hologram optical element.

20. The optical recording and/or reproducing apparatus of claim 5, wherein the signal processing unit further comprises an amplifier to amplify at least one of the detection signals from the inner and outer light beam portions before subtraction.

21. The optical recording and/or reproducing apparatus of claim 5, wherein:
   the light source comprises a 405-nm wavelength; and
   the objective lens has a numerical aperture of about 0.85 and a focal length of about 1.76 mm for a 0.1-mm thick RAM type optical disc.

22. The optical recording and/or reproducing apparatus of claim 5, wherein the signal processing unit comprises:
   a subtractor detecting the difference signal by subtracting the detection signal from at least one outer light beam portion from the detection signal of at least one inner light beam portion;

a driver to drive said optical element based upon said detected difference signal; and a land/groove discriminating portion varying the degree of the effect of thickness variation of the optical disc by controlling said driver and outputting a land/groove signal discriminating between the land and the groove of the optical disc from variation in the DC level of the difference signal.

23. The optical recording and/or reproducing apparatus of claim 5, wherein the optical element comprises:

a pair of transparent substrates having an electrode pattern; and liquid crystals injected between the pair of transparent substrates, to vary the degree of the effect of thickness variation of the optical disc.

24. A spherical aberration compensation method comprising:

emitting a light beam onto an optical disc having lands and grooves through an optical element capable of causing and varying an effect of thickness variation of the optical disc;

detecting a light beam reflected/diffracted from the optical disc by dividing the reflected/diffracted light beam into inner and outer light beam portions; and compensating for the spherical aberration caused by a thickness variation of the optical disc by detecting variation in a difference signal between detection signals from the inner and outer light beam portions while varying the degree of the effect of thickness variation of the optical disc by driving the optical element.

25. A method of discriminating between a land and a groove of a land-groove type optical disc, the method comprising:

emitting a single light beam onto the optical disc through an optical element causing an effect of thickness variation of the optical disc;

detecting a light beam reflected from the optical disc by dividing the reflected beam into inner and outer light beam portions; and detecting variation in a difference signal between detection signals from the inner and outer light beam portions according to the effect of thickness increase or decrease of the optical disc.

26. An optical recording and/or reproducing apparatus comprising:

an optical pickup comprising an optical element on a traveling path of a light beam emitted from a light source to be focused on a land-groove type optical disc by an objective lens, the optical element causing and varying an effect of thickness variation of the optical disc, and a photodetector device to detect the light beam reflected/diffracted by the optical disc by dividing the reflected/diffracted light beam into inner and outer light beam portions; and a signal processing unit to detect a difference signal by subtracting a detection signal from at least one outer light beam portion from a detection signal from the inner light beam portion and to compensate for the spherical aberration caused by a thickness variation of the optical disc by detecting variation in the difference signal while varying the degree of the effect of thickness variation of the optical disc by driving the optical element.

* * * * *